US006782448B2

United States Patent
Goodman et al.

(10) Patent No.: US 6,782,448 B2
(45) Date of Patent: Aug. 24, 2004

(54) TRANSPARENT CODE UPDATE IN AN AUTOMATED DATA STORAGE LIBRARY

(75) Inventors: Brian Gerard Goodman, Tucson, AZ (US); Leonard George Jesionowski, Tucson, AZ (US); Robin Daniel Roberts, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 324 days.

(21) Appl. No.: 10/113,670

(22) Filed: Apr. 2, 2002

(65) Prior Publication Data

US 2003/0188304 A1 Oct. 2, 2003

(51) Int. Cl.[7] .............................................. G06F 12/00
(52) U.S. Cl. ...................... 711/112; 717/169; 717/170; 717/171; 717/172; 717/173; 711/111; 711/114; 711/147; 711/150; 711/154; 711/168; 711/170; 713/1; 713/2; 360/12; 360/92; 360/234.5; 369/30.06; 700/67; 700/84; 700/90; 700/92
(58) Field of Search .............................. 700/67, 84, 90, 700/92; 711/111–112, 114, 147, 150, 154, 168, 170; 713/1–2; 717/169–173; 360/12, 92, 234.5; 369/30.06

(56) References Cited

U.S. PATENT DOCUMENTS

| 5,732,275 | A | | 3/1998 | Kullick et al. ............. 395/712 |
|---|---|---|---|---|
| 5,764,992 | A | | 6/1998 | Kullick et al. ............. 395/712 |
| 6,044,442 | A | * | 3/2000 | Jesionowski ............... 711/153 |
| 6,151,643 | A | | 11/2000 | Cheng et al. ................ 710/36 |
| 6,167,567 | A | | 12/2000 | Chiles et al. ................ 717/11 |
| 6,237,091 | B1 | | 5/2001 | Firooz et al. ................. 713/1 |
| 6,253,281 | B1 | * | 6/2001 | Hall ......................... 711/112 |
| 6,266,736 | B1 | * | 7/2001 | Atkinson et al. ........... 711/103 |
| 6,304,798 | B1 | * | 10/2001 | Carpenter .................. 700/258 |
| 6,519,678 | B1 | * | 2/2003 | Basham et al. ............. 711/112 |

FOREIGN PATENT DOCUMENTS

JP           2000031998 A    1/2000       ........... H04L/12/28

* cited by examiner

*Primary Examiner*—Donald Sparks
*Assistant Examiner*—Hashem Farrokh
(74) *Attorney, Agent, or Firm*—John H. Holcombe

(57) ABSTRACT

An automated data storage library accesses data storage media from storage shelves in response to commands from external host(s). The library receives a code update image while continuing to operate. The library is operated to an off-line status at external interface(s) that permit communication with the host(s). Then, and after the image is stored in nonvolatile memory, the processor(s) are reset, thereby activating the code update image, the processor(s) subsequently coming up from the reset to an operational state. Then, the library goes to an on-line status at the external interface(s).

36 Claims, 5 Drawing Sheets

TRANSPARENT CODE UPDATE IN AN AUTOMATED DATA STORAGE LIBRARY

FIELD OF THE INVENTION

This invention relates to automated data storage libraries which access data storage media in response to commands from external host systems, and, more particularly, to maintaining updated code levels for an automated data storage library.

BACKGROUND OF THE INVENTION

Automated data storage libraries provide a means for storing large quantities of data in data storage media that are not permanently mounted on data storage drives, and that are stored in a readily available form on storage shelves. One or more robot accessors retrieve selected data storage media from storage shelves and provide them to data storage drives. Typically, data stored on data storage media of an automated data storage library, once requested, is needed quickly. Thus, it is desirable that an automated data storage library be maintained in an operational condition as much as possible, such as the well known "24×7×365" availability.

Automated data storage libraries are typically operated by one or more processors, such as a central controller which interfaces with the host systems through an external interface, and provides a constantly updated inventory of the locations of the data storage media within the library, and a robot control system which identifies precise locations of the data storage drives and the storage shelves, and calculates the best operation of the robot accessor(s) to efficiently transport data storage media between the various storage shelves and data storage drives. The processors are run by program code, often called "firmware", since the code is related to the hardware constituting the library. Often, the firmware requires updating, for example, if a new or updated function or apparatus is provided to the library.

It is known that updates may be provided for applications running on computer processors, such as discussed by U.S. Pat. Nos. 5,732,275 and 5,764,992. However, such updates are to applications that do not constitute the "primary function" of the computer processor, such that the "primary function" continues while the application is updated. Further, automated data storage libraries are typically stand alone devices, without redundant libraries, such that any interruption of the primary function of an automated data storage library must be minimized, yet the firmware of the processor(s) conducting the primary function must be kept in an updated state. A firmware update may be provided to a library by known means, such as at an external interface or by means of a CD ROM or other input. If the library is nodal, comprising distributed processors, the individual processors or associated memories may be interchanged with updated modules. Rather than change all nodes or update a node via an external interface, it is known that proper firmware levels may be maintained in a nodal system, such as an automated data storage library, as is discussed in copending U.S. patent application Ser. No. 09/755,832, filed Jan. 5, 2001.

In the event of a required update to the firmware of a processor, or of processors, operating the library, the library is typically idle for the duration of time while the update is loaded at the processor, or processors, of the library. Also typically, during the firmware update and subsequent reset, data storage media might be manually moved, removed or added. As the result, the data storage media may have to be reinventoried when the library comes up.

Additionally, should the update occur while the robot accessor(s) are moving or are away from the home position, the precise location of each robot accessor will be lost, such that it must hunt for a start location at a very slow rate to insure against collision, extending the effective downtime of the library.

SUMMARY OF THE INVENTION

It is an object of the present invention to provide a firmware update of an automated data storage library, while minimizing the time that the library is off-line.

Another object of the present invention is to allow communication with attached host systems while firmware is being updated, the communication indicating that the library will soon be on-line.

A further object of the present invention is to avoid having the robot accessor extend the effective downtime of the library.

A still further object of the present invention is to prevent loss of the inventory of the data storage media located in the library during a firmware update.

In accordance with the present invention, an automated data storage library, at least one processor of the library, a processor node of a plurality of processor nodes, a method, and computer readable program code provide a transparent code update for the library processor(s).

An automated data storage library is arranged for accessing data storage media in response to commands from at least one external host system, and comprises a plurality of storage shelves for storing data storage media; at least one data storage drive for reading and/or writing data with respect to the data storage media; at least one robot accessor for transporting the data storage media between the plurality of storage shelves and the data storage drive(s); at least one external interface for communicating with the external host system(s); at least one processor node, processor node(s) having at least a processor, the processor operating from a current code image; and at least one nonvolatile memory, each associated with at least one of the processor nodes.

In an embodiment of the present invention, the automated data storage library, via its processor node(s), receives a code update image while operating the automated data storage library, and stores the code update image in memory. During and subsequent to receiving the code update image, the automated data storage library continues to operate. The library determines, optionally within a predetermined timeout period, whether the processor node(s) have the code update image stored in memory; and, if so, subsequently, operates the automated data storage library to an off-line status at one or more external interface(s); resets the processor of the at least one processor node having the stored code update image, thereby activating the code update image in place of the current code image, the processor subsequently coming up from the reset to an operational state; and, subsequently, goes to an on-line status at the external interface(s).

Thus, the library provides an update to code of the library processor(s), while minimizing the time that the library is off-line, such that the update is effectively transparent to the user or host system(s).

In another embodiment of the present invention, the automated data storage library comprises a work queue for jobs received from the host system(s), and, in operating the library to the off-line status, additionally completes the jobs in the work queue.

In a further embodiment of the present invention, the automated data storage library, in operating the library to the off-line status, reports at the external interface(s) that the automated data storage library is currently not ready and will become ready.

Thus, the library permits communication with attached host systems while the code is being updated, the communication indicating that the library will soon be on-line.

In another embodiment of the present invention, the automated data storage library additionally moves the robot accessor to a "home" position prior to resetting the processor (s).

Thus, the robot accessor is moved rapidly to a known position, where it may begin normal operation immediately after the update of the processors.

In still another embodiment of the invention, the inventory of data storage media located in the library is stored prior to resetting the processor(s).

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
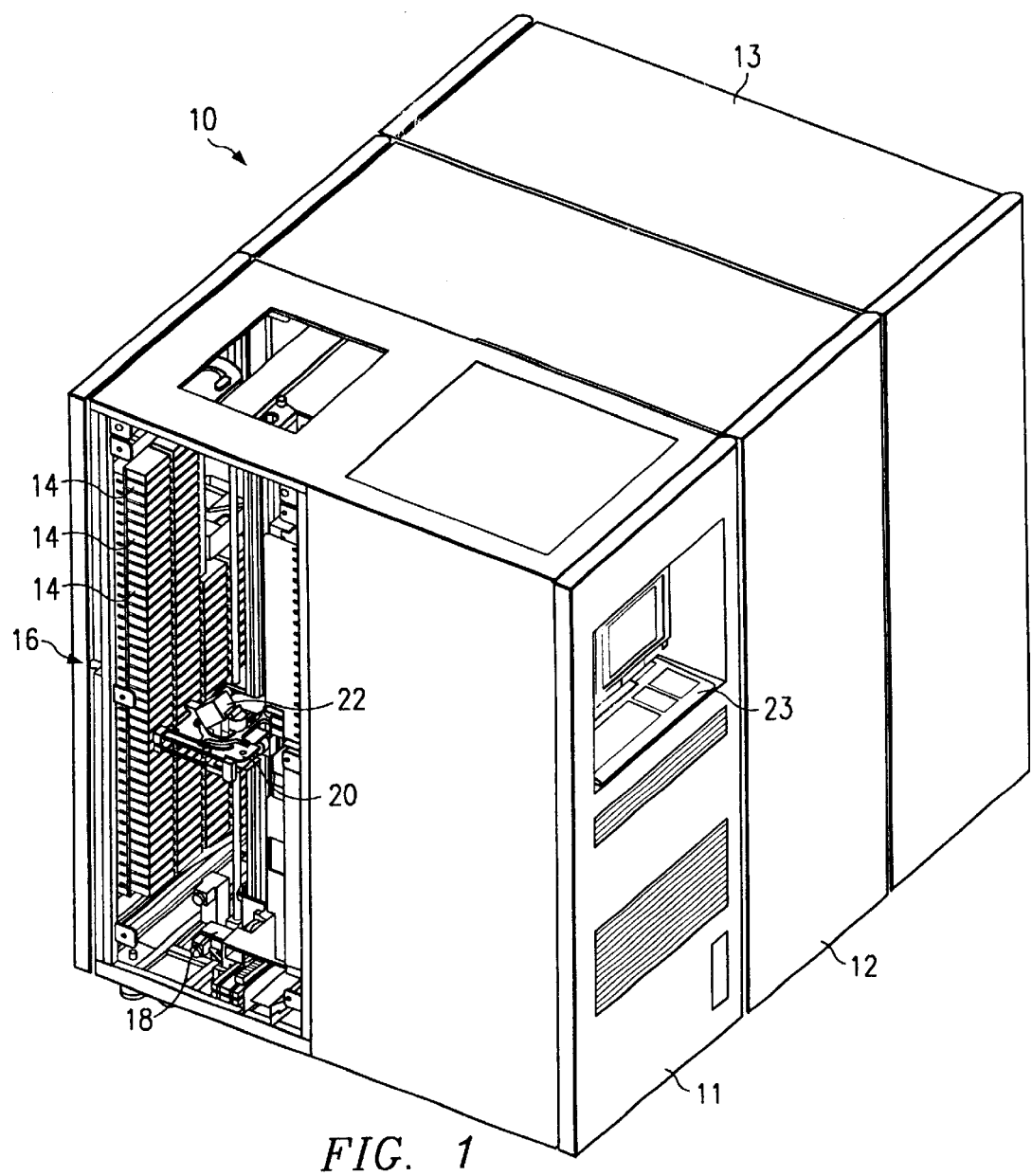
FIG. 1 is an isometric view of an automated data storage library in accordance with the present invention.

FIG. 1 illustrates an embodiment of an automated data storage library 10, in accordance with the present invention, which is arranged for accessing data storage media 14 in response to commands from at least one external host system, and comprises a plurality of storage shelves 16 for storing data storage media; at least one data storage drive for reading and/or writing data with respect to the data storage media; and at least one robot accessor 18 for transporting the data storage media between the plurality of storage shelves 16 and the data storage drive(s). The library may also comprise an operator panel 23 or other user interface, such as a web-based interface, which allows a user to interact with the library. The library 10 may comprise one or more frames 11–13, each having storage shelves 16 accessible by the robot accessor 18. The robot accessor 18 comprises a gripper assembly 20 for gripping one or more data storage media 14, and may include a bar code scanner 22 or reading system, such as a smart card reader or similar system, mounted on the gripper 20, to "read" identifying information about the data storage media 14.

Figure 2:
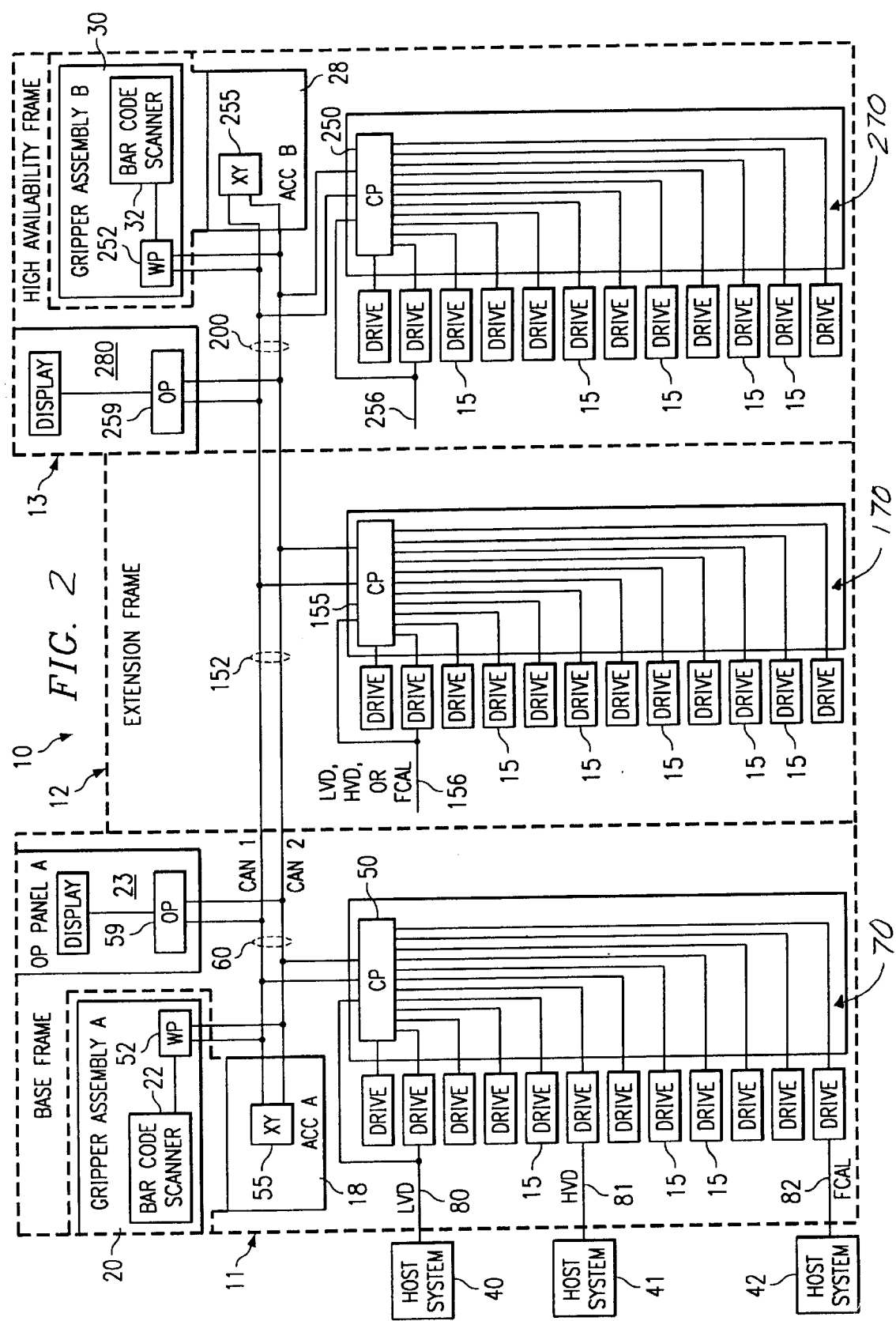
FIG. 2 is a block diagrammatic representation of an embodiment of an automated data storage library of FIG. 1, employing a plurality of processor nodes.

FIG. 2 illustrates an embodiment of a data storage library 10 of FIG. 1, which employs a plurality of processor nodes. An example of a data storage library which may implement the present invention is the IBM 3584 Tape Library. The library comprises a base frame 11, may additionally comprise one or more extension frames 12, and may comprise a high availability frame 13.

The base frame 11 of the library 10 comprises one or more data storage drives 15, and a robot accessor 18. As discussed above, the robot accessor 18 comprises a gripper assembly 20 and may include a reading system 22 to "read" identifying information about the data storage media 14. The data storage drives 15, for example, may be optical disk drives or magnetic tape drives, and the data storage media 14 may comprise optical or magnetic tape media, respectively, or any other removable media and associated drives. As examples, a data storage drive may comprise an IBM LTO Ultrium Drive, may comprise a DLT 8000 Drive, etc. Additionally, a control port may be provided, which acts to communicate between a host and the library, e.g., receiving commands from a host and forwarding the commands to the library, but which is not a data storage drive.

The extension frame 12 comprises additional storage shelves, and may comprise additional data storage drives 15. The high availability frame 13 may also comprise additional storage shelves and data storage drives 15, and comprises a second robot accessor 28, which includes a gripper assembly 30 and may include a bar code scanner 32 or other reading device, and an operator panel 280 or other user interface. In the event of a failure or other unavailability of the robot accessor 18, or its gripper 20, etc., the second robot accessor 28 may take over.

Each of the robot accessors 18, 28 moves its gripper in at least two directions, called the horizontal "X" direction and vertical "Y" direction, to retrieve and grip, or to deliver and release the data storage media 14 at the storage shelves 16 and to load and unload the data storage media at the data storage drives 15.

Referring to FIG. 2, the library 10 receives commands from one or more host systems 40, 41 or 42. The host systems, such as host servers, communicate with the library directly, e.g., on path 80, through one or more control ports (not shown), or through one or more data storage drives 15, providing commands to access particular data storage media and move the media, for example, between the storage shelves and the data storage drives. The commands are typically logical commands identifying the media and/or logical locations for accessing the media.

The library is controlled by one or more processors, the processors receiving the logical commands and converting the commands to physical movements of the robot accessor 18, 28.

Figure 3:
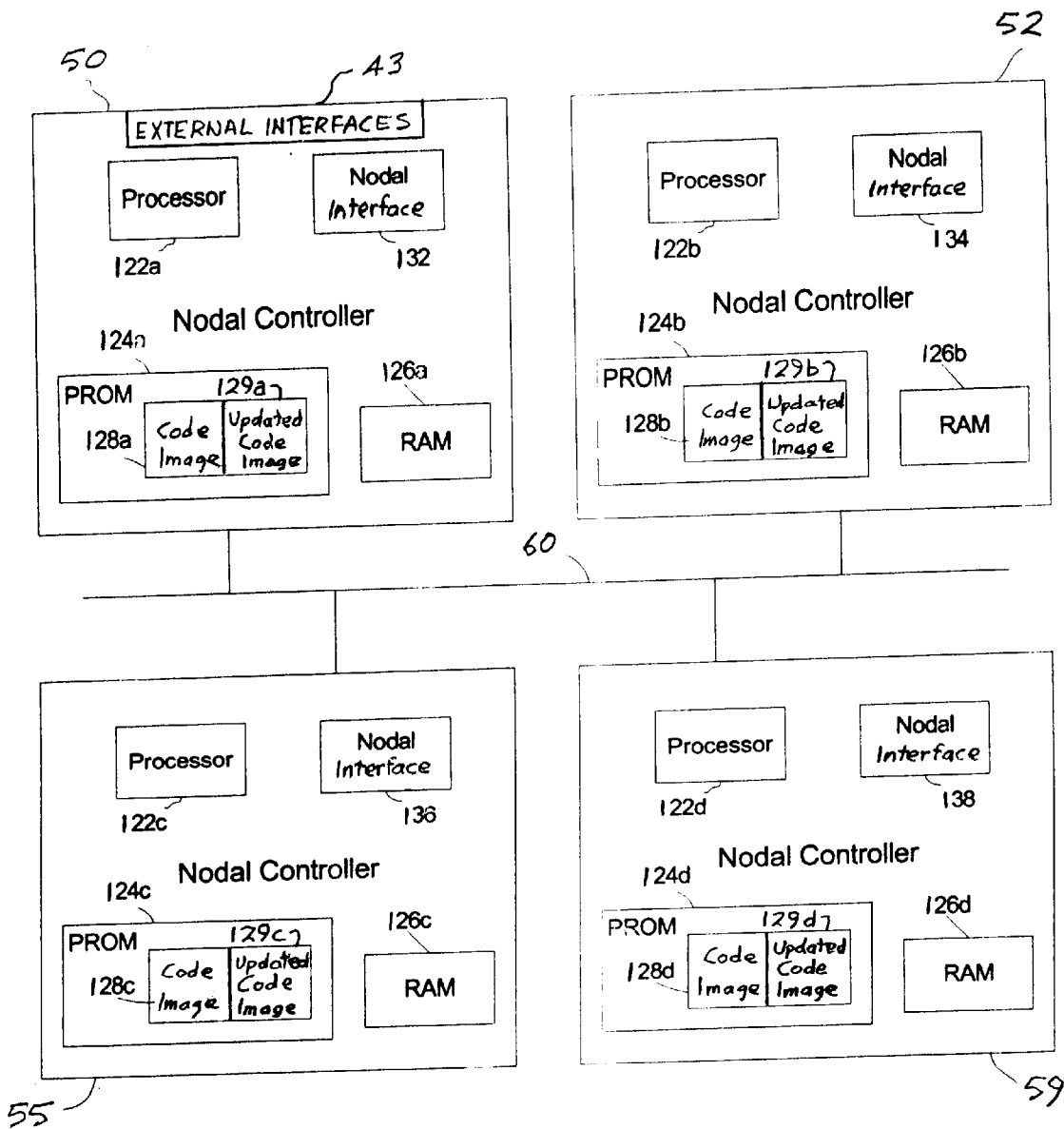
FIG. 3 is a block diagrammatic representation of a plurality of processor nodes of FIG. 2.

Referring additionally to FIG. 3, the processors may comprise a centralized control system, or a distributed control system of a plurality of processor nodes. In one example of a distributed control system, a communication processor node 50 may be located in the base frame 11. The communication processor node provides a communication link for receiving the host commands, either directly or from the drives 15, via at least one external interface 43. The communication processor node 50 may additionally provide a communication link 70 for operating and/or communicating with the data storage drives 15.

The communication processor node 50 may be located in the base frame 11, close to the data storage drives 15. Additionally, in an example of a distributed processor system, one or more additional work processor nodes are provided, which may comprise, e.g., a work processor node 52 that may be located at the robot accessor 18, and that is coupled to the communication processor node 50. Each work processor node may respond to received commands that are broadcast to the work processor nodes from any communication processor node, and the work processor node may also direct the operation of the robot accessor, providing move commands. An XY processor node 55 may be provided and may be located at an XY system of the robot accessor 18. The XY processor node 55 is coupled to the work processor node 52, and is responsive to the move commands, operating the XY system to position the gripper 20.

Also, an operator panel processor node 59 may be provided at the operator panel 23 for providing an interface for communicating between the operator panel and the communication processor node 50, the work processor node 52, and the XY processor node 55.

A common bus 60 may be provided, allowing communication between the various processor nodes. The common bus may comprise a redundant wiring network, such as the commercially available "CAN" bus system, which is a multi-drop network, having a standard access protocol and wiring standards, for example, as defined by CiA, the CAN in Automation Association, Am Weich selgarten 26, D-91058 Erlangen, Germany. Other similar bus networks, or a wireless network system, such as RF or infrared, may be employed in the library as is known to those of skill in the art. The processor nodes, e.g., nodes 50, 52, 55 and 59 of FIG. 3, may be coupled to the common bus 60 at a nodal interface 132, 134, 136 and 138.

Referring to FIG. 2, the communication processor node 50 is coupled to each of the data storage drives 15 of the base frame 11, via lines 70, communicating with the drives and with host systems 40, 41 and 42. Alternatively, the host systems may be directly coupled to the communication processor node 50 at input 80, or to control port devices (not shown) which connect the library to the host system(s) with a library interface similar to the drive/library interface. As is known to those of skill in the art, various communication arrangements may be employed for communication with the hosts and with the data storage drives. In the example of FIG. 2, host connections 80 and 81 are SCSI busses. Bus 82 comprises an example of a Fibre Channel-Arbitrated Loop which is a high speed serial data interface, allowing transmission over greater distances than the SCSI bus systems.

The data storage drives 15 may be in close proximity to the communication processor node 50, and may employ a short distance communication scheme, such as SCSI, or a serial connection, such as RS-422. The data storage drives 15 are thus individually coupled to the communication processor node 50 by means of lines 70. A data storage drive 15 providing communication between a host system and the library is routed to an external interface 43 of FIG. 3.

An extension frame 12 may be provided, and may be coupled by an extension common bus 152 to the base frame common bus 60. Another communication processor node 155, similar to communication processor node 50 of FIG. 3, may be located in the extension frame and may communicate with hosts, e.g., at input 156, and data storage drives 15 in frame 12, e.g., via lines 170. Thus, commands from hosts may be received either directly, through a control port (not shown), or via the data storage drives, via an external interface, similar to external interface 43 of FIG. 3. The communication processor node 155 is coupled to the extension common bus 152 at a nodal interface such as nodal interface 132 of FIG. 3, the communication processor node 155 providing a communication link for the commands to the extension common bus 152, so that the commands are linked to the base frame common bus 60 and to the work processor node 52.

The communication processor node 155 may be mounted in the extension frame 12, closely adjacent to the coupled data storage drives 15 of the extension frame 12, communicating with the drives and with the attached host systems. The data storage drives 15 are also individually coupled to the communication processor node 155 by means of lines 170.

Additional extension frames with identical communication processor nodes 155, storage shelves 16, data storage drives 15, and extension busses 152, may be provided and each is coupled to the adjacent extension frame.

Further, the data storage library 10 may additionally comprise another robot accessor 28, for example, in a high availability frame 13. The robot accessor 28 may comprise a gripper 30 for accessing the data storage media, and an XY system 255 for moving the robot accessor. The high availability frame may be adjacent an extension frame 12, or adjacent the base frame 11, and the robot accessor 28 may run on the same horizontal mechanical path as robot accessor 18, or on an adjacent path. The exemplary control system additionally comprises an extension common bus 200 coupled to the extension common bus 152 of an extension frame or to the common bus 60 of the base frame. Another communication processor node 250 may be provided, which is also similar to communication processor node 50, and may be located in the high availability frame 13, for receiving commands from hosts, either directly at input 256, or through control ports (not shown), or through the data storage drives 15 and line 270, e.g., at input 256, employing an external interface similar to external interface 43 illustrated in FIG. 3. The communication processor node 250 is coupled to the high availability frame extension common bus 200 and provides a communication link for the commands to the extension common bus, e.g., at a nodal interface 132 of FIG. 3.

The communication processor node 250 may be mounted closely adjacent to the coupled data storage drives 15 of the high availability frame 13, communicating with the drives and with the attached host systems. The data storage drives 15 are also individually coupled to the communication processor node 250 by means of lines 270, such as RS-422.

Referring to FIG. 2, a computer program implementing the present invention may be provided at one of the processor nodes, e.g., at work processor 52, or, optionally at processor 50, processor 155, or processor 250, or may be implemented in a plurality, or all, of the processor nodes.

Referring to FIG. 3, the processor nodes 50, 52, 55 and 59 comprise a processor 122a, b, c, d, which may comprise any microprocessor device known in the art. The processor 122a, b, c, d, operates under the control of program code, often called "firmware", since the code is related to the hardware constituting the library, as discussed above. The firmware is illustrated as a code image 128a, b, c, d, maintained in a nonvolatile programmable memory 124a, b, c, d. The nonvolatile memory 124a, b, c, d may comprise any programmable nonvolatile memory device known in the art, such as a flash memory, electronically erasable programmable read only memory (EEPROM), battery backed-up RAM, etc. In addition, the processor nodes may utilize work areas in RAM memory 126a, b, c, d, which may comprise any memory device known in the art. Alternatively, the nonvolatile memory 124a, b, c, d and/or RAM 126a, b, c, d may be located in processor 122a, b, c, d, respectively.

The firmware program code image may be the same for all of the processor nodes, having both common code and specific code for each of the various functions, but which specific code is only used by the processor of the specific function. Alternatively, different code images may be provided for each of the processor nodes, specifically incorporating only code required by the processor of the specific function. Herein, "firmware", "firmware code", "firmware code image", "code image", or "code", are defined as either code images which are the same for each processor node, or are specific to each processor node, or combinations thereof. Further, an update to a code image may comprise a complete new code image, or may comprise a portion of an image that is easily merged with an existing code image, as is known to those of skill in the art. Hence, "firmware code update image", "code update image" or any combination of the terms employing the term "update" are defined as complete code images or portions of code images.

Often, the firmware requires updating, for example, if a new or updated function or apparatus is provided to the library. If the library is nodal, comprising distributed processors, such as processors 122a, b, c, d of FIG. 3, the individual processors or associated memories may be interchanged with updated modules. Rather than update all nodes, or update a down level node, through an external interface, it is known that proper firmware levels may be maintained in a nodal system as is discussed in copending U.S. patent application Ser. No. 09/755,832, filed Jan. 5, 2001.

Figure 4:
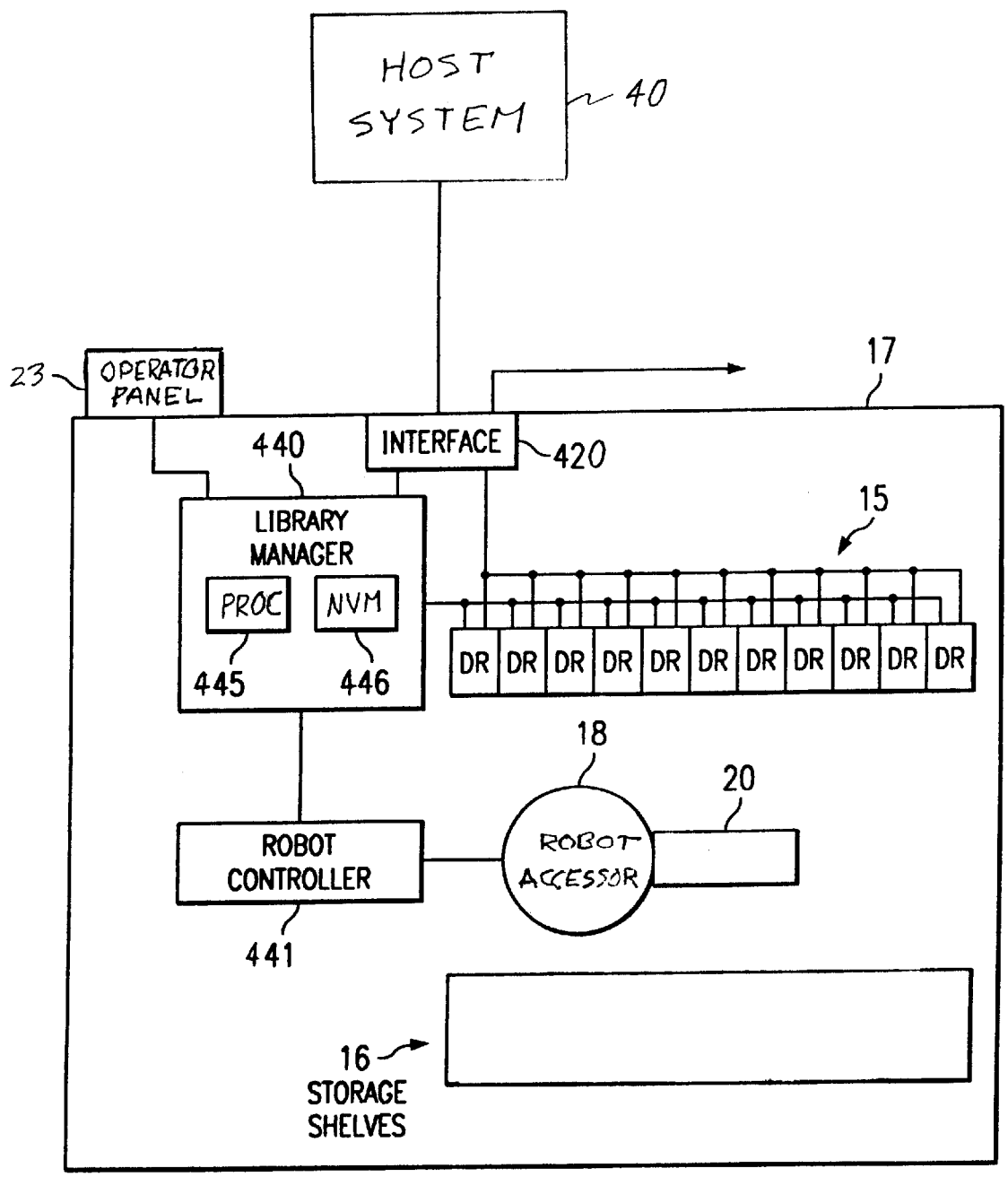
FIG. 4 is a block diagrammatic representation of an alternative embodiment of an automated data storage library of FIG. 1, employing a single processor node to be updated.

Referring to FIG. 4, an alternative embodiment of an automated data storage library is illustrated, which employs a single processor node to be updated. The alternative library 17 is arranged for accessing data storage media 14 of FIG. 1 from 15 storage shelves 16 in response to commands from at least one external host system 40, and comprises at least one data storage drive 15 for reading and/or writing data with respect to the data storage media; and at least one robot accessor 18 for transporting the data storage media between the plurality of storage shelves 16 and the data storage drive(s) 15. The library may also comprise an operator panel 23 or other user interface, such as a web-based interface, which allows a user to interact with the library. The robot accessor 18 comprises a gripper assembly 20 for gripping one or more data storage media, and may include a reading system to "read" identifying information about the data storage media.

Referring to FIG. 4, the library 17 receives commands from one or more host systems 40 at one or more external interfaces 420. The host systems, such as host servers, communicate with the library, providing commands to access particular data storage media and move the media, for example, between the storage shelves and the data storage drives. The commands typically identify the media and/or logical locations for accessing the media.

An example of a processor node that may require updating in accordance with the invention comprises a library manager 440, which both provides a communication link for receiving the host commands, via the at least one external interface 420, and provides the function of a work processor node which directs the operation of the robot accessor, providing move commands. A robot controller 441 may be provided which directly operates the robot accessor and the gripper to position the gripper 20. Alternatively, a single processor node, e.g., node 440, may perform both the function of the library manager and the robot controller.

A computer program implementing the present invention may be provided at the library manager processor 440. The processor node 440 comprises at least one processor 445, which may comprise any microprocessor device known in the art. Examples of microprocessor devices may comprise chips, PC's, RISC, work station computers, or specialized circuits. The processor 445 operates under the control of program code, often called "firmware", as is discussed above. The firmware is maintained in a nonvolatile programmable memory 446. The nonvolatile memory 446 may comprise any programmable nonvolatile memory device known in the art, such as a flash memory, electronically erasable programmable read only memory (EEPROM), battery backed-up RAM, etc. Alternatively, the nonvolatile memory 446 may be located in processor 445.

In the event of a required update to the firmware of a processor, or of processors, operating the library, the present invention avoids a shut down for the duration of time while the update is loaded at the processor, or processors, of the library, and avoids losing the precise location of each robot accessor.

Figure 5:
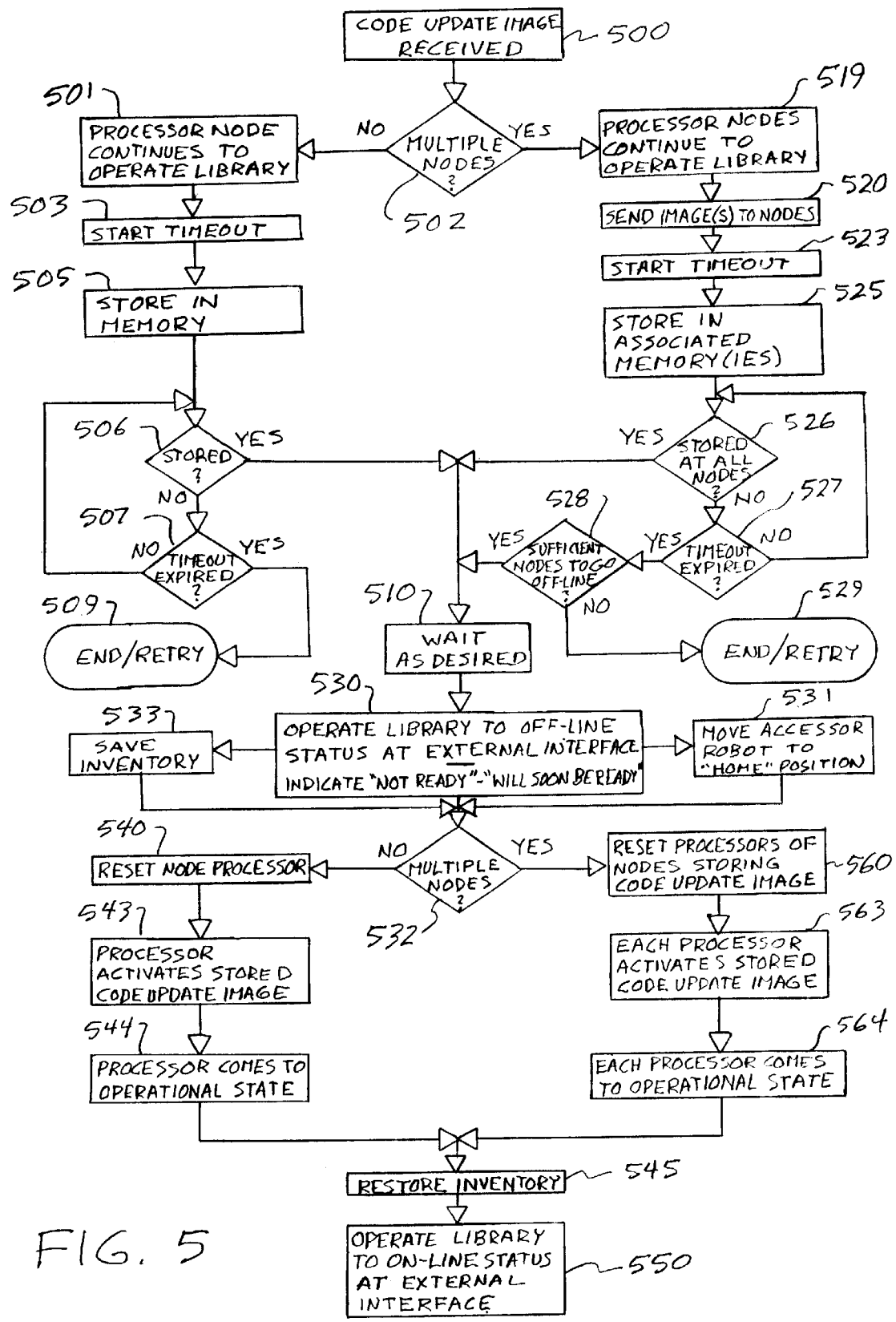
FIG. 5 is a flow chart depicting an embodiment of the method of the present invention for providing a transparent code update for the library processor(s) of FIGS. 2 and 3.

Referring additionally to FIG. 5, a code update image is received in step 500. Referring to FIGS. 2 and 3, the code update image may be received at an external interface of a communication processor node 50, 155, 250 from an external interface of a work processor node 52, 252 (FIG. 2), etc., from a host system 40–42, from the media of a drive 15, from an operator panel or terminal 23, or by means of replacement of a module comprising one of the processor nodes 50, 52, 55, 59, 155, 250, 252, 255, 259, or the processor or nonvolatile memory of one of the processor nodes. Referring to FIG. 4, the code update image may be received at the external interface 420 of the library, from another external interface such as a diagnostic port (not shown), from a host system 40, from the media of a drive 15 or from an operator panel or terminal 23.

In an embodiment of the present invention, the automated data storage library, via its processor node(s), upon receiving a code update image, determines in step 502 whether multiple processor nodes are to be updated. Step 502 is an optional step, in that separate program code may be employed in libraries having multiple processor nodes to be updated and in libraries having only a single processor node to be updated.

Using the example of FIG. 4, which employs a single processor node to be updated, the process moves to step 501, in which the processor node continues to operate the automated data storage library. Importantly, the library is operated at least until it is taken to an off-line status. Then, the process moves to step 503 and starts a timeout period. The purpose of the timeout period is to allow for receipt of a code update image that is discontinuous or in portions, and to allow storage of the incomplete image, without implementation. As an example, the code update image may be sent by a host in small portions so as to not interfere with normal storage or access commands sent to the library.

The timeout period of step 503 may comprise a long period, such that the entire code update image is likely to be received before the expiration of the period. Alternatively, the timeout period may be relatively short, such that only a continuously received code update image is likely to be received, and any discontinuously received image is the subject of several separate receipt operations. Still alternatively, steps 503 and 507 may be omitted.

Referring additionally to FIG. 4, in step 505, the library, e.g., employing processor node 440, upon receiving the code update image while operating the automated data storage library, stores the code update image in the nonvolatile memory 446.

Alternatively, in step 505, the library, while operating, stores the code update image in a volatile memory, such as RAM, as it is received. The library may resolve the timeout of step 507 at this point, and subsequently transfer the code update image to a nonvolatile memory, e.g., nonvolatile memory 446.

Hence, herein, step 505 may comprise two parts, first storing the code update image initially in a volatile memory, and subsequently, but before step 540, transferring the code update image to nonvolatile memory.

Importantly, during and subsequent to receiving the code update image, the processor node continues to operate the automated data storage library from the current code image. This may be achieved, for example, by executing the current code image out of RAM. In this case, the code image in nonvolatile memory would be copied to RAM after a power-on or reset operation, as will be discussed. Alternatively, the current code image may be located in a different area of nonvolatile memory from the code update image. Still further, the current code image may be located in a different nonvolatile memory from the code update image.

Steps 506 and 507 comprise a loop in which the processor, in step 506, determines whether the complete firmware update code image has been stored as yet, and, in step 507, determines whether the timeout period has expired. So long as the answer is "NO", the loop continues to operate.

If the timeout period of step 507 expires before the entire firmware update code image has been stored, the process moves to step 509 and is either temporarily ended, permanently ended, or a retry is conducted. The process is temporarily ended if only a portion of the code image has been received and one or more additional portions are expected later. A retry is conducted if the receipt of the code image was interrupted, for example, the communication from a host system may have been interrupted by a more pressing communication. Upon a number of unsuccessful retries, or upon receipt or determination of an error condition that indicates the update will have to be conducted at another time, the process is permanently ended in step 509. Alternatively, step 506 and/or step 509 may be omitted. In this case, an error or timeout leads to step 510 where the remaining steps would be used to recover from the error or timeout.

If the complete code update image, as defined above, has been stored within the timeout period, step 506 leads to step 510.

In FIG. 5, referring to an automated data storage library having multiple processor nodes to be updated, one of the processor nodes receives the code update image in step 500. For example, communication processor node 50 may receive the code update image, e.g., at an external interface 43 as illustrated by FIGS. 2 and 3. Alternatively, placing or replacing a processor node in the system, when the node stores a code update image, may constitute "receipt" of the code update image. In such a case, the new or replacement node is defined as the "receiving processor node", and the code update image is defined as having been "received" and stored in memory. In the multi-node system, step 502, discussed above, leads to step 519, in which the processor nodes continue to operate the automated data storage library. Importantly, the library is operated at least until it is taken to an off-line status. Then, the process moves to step 520. In step 520, the processor node receiving the update code image, such as communication processor node 50, sends the code image to all of the processor nodes that are to be updated. As defined above, one or multiple code images may be received. The receiving processor node may receive the entire code update image, as will be discussed, and send the code image, and subsequently store the image in its nonvolatile memory, or alternatively simultaneously receive and store the code image in its nonvolatile memory. The processors are arranged to interleave various operations.

In step 523, one of the processor nodes, such as the receiving processor node of step 500, starts a timeout period. As discussed above, the timeout period allows for receipt of a code update image that is discontinuous or in portions. As an example, the code update image may comprise a separate code update image for each processor node and is sent by a host as the separate portions so as to not interfere with normal storage or access commands sent to the library. Alternatively, step 523 may be omitted.

Referring additionally to FIG. 3, in step 525, each of the processor nodes, such as processor nodes 50, 52, 55 and 59, upon receiving the code update image while operating the automated data storage library, stores the code update image in the nonvolatile memory 124a, b, c, d as the updated code image 129a, b, c, d. Still further, the current code image 128a, b, c, d may be located in a different nonvolatile memory from the code update image 129a, b, c, d. Alternatively, a nonvolatile memory may be positioned on the common bus, but is associated with a processor node. Still alternatively, a nonvolatile memory of one processor node may be associated with both itself and with another processor node.

Importantly, during and subsequent to receiving and storing the code update image, the processor nodes continue to operate the automated data storage library from the respective current code images 128a, b, c, d. This may be achieved, for example, by executing the current code image out of RAM. In this case, the code image in nonvolatile memory would be copied to RAM after a power-on or reset operation, again, as will be discussed. Alternatively, the current code 128a, b, c, d image may be located in a different area of nonvolatile memory from the code update image 129a, b, c, d. Still further, the current code image 128a, b, c, d may be located in a different nonvolatile memory from the code update image 129a, b, c, d.

Steps 526 and 527 comprise a loop in which a processor node, in step 526, determines whether the complete update code image has been stored in the nonvolatile memory of all the processor nodes to be updated as yet, and, in step 527, determines whether the timeout period has expired. So long as the answer is "NO", the loop continues to operate.

If the timeout period of step 527 expires before all of the update code images have been stored, the process moves to step 528. In step 528, the determination is made whether enough of the processor nodes have stored the appropriate firmware update code image that the library may go off-line and implement the updated code images. For example, if specialized code images are employed for the various processor nodes, not all of the code images may require updating. In addition, if each of the nodes have common code, then a successful update of only a single node could result in a self recovery where this single node updates the rest of the library after the final "on-line" operation of step 550, to be discussed.

If "NO" in step 528, the process moves to step 529, and is either temporarily ended, permanently ended, or a retry is conducted. As discussed above, the process is temporarily ended if only a portion of the code image(s) have been received and one or more additional portions are expected later. A retry is conducted if the receipt of the code image(s) was interrupted, for example, the communication from a host system may have been interrupted by a more pressing communication. Upon a number of unsuccessful retries, or upon receipt or determination of an error condition that indicates the update will have to be conducted at another time, the process is permanently ended in step 529. Alternatively, step 526 and/or step 528 and/or step 529 may be omitted. In this case, an error or timeout would lead to step 510, where the remaining steps would be used to recover from the error or timeout.

If either, all of the complete code update images, as defined above, have been stored in the nonvolatile memories of the processor nodes within the timeout period, step 526 leads to step 510; or, if enough of the processor nodes have stored the appropriate update code image that the library may go off-line and implement the updated code images, step 528 leads to step 510.

Alternatively, steps 525 and 526 may comprise storing a copy of the code update image, in a volatile RAM, as it is received. If there is a timeout of step 527, it may be resolved at this point, and, subsequently, the library transfers the code update image to the nonvolatile memory(ies) associated with the processor nodes. Alternatively, the timeout is not resolved until all code update images have been stored in nonvolatile memory. In accordance with the invention, the code update image must be stored in the associated nonvolatile memory prior to reset of a processor node.

Hence, herein, step 525 may comprise two parts, first storing a copy of the code update image, and subsequently, but before step 560, transferring the code update image to the nonvolatile memory(ies) associated with the processor nodes.

Step 510 comprises a wait period, if any. In step 530, the processor node(s) operate the automated data storage library to an off-line status at the external interface(s) (e.g., external interface 80 in FIG. 2, external interface 43 in FIG. 3, external interface 420 in FIG. 4).

In one embodiment of the present invention, the automated data storage library comprises a work queue for jobs received from the host system(s), and in operating the library to the off-line status of step 530, additionally completes the jobs in the work queue.

In another embodiment of the present invention, the automated data storage library, in operating the library to the off-line status of step 530, reports at the external interface(s) that the automated data storage library is currently not ready and will become ready. Such reports are understood as provided under standard protocols by those of skill in the art.

Thus, the library permits communication with attached host systems while code is being updated, the communication indicating that the library will soon be on-line.

Alternatively, the library may be operated to an off-line status in step 530 prior to, or as, the code update image is stored in nonvolatile memory(ies) associated with the processor nodes. Thus, steps 503–530 and steps 520–530 may be reordered.

In a further embodiment of the present invention, the automated data storage library, additionally, in step 531, moves the robot accessor 18 to a "home" position.

Thus, the robot accessor is moved rapidly to a known position, where it may begin normal operation immediately after the update of the processors.

In a still further embodiment of the present invention, in case the power-on or reset will cause loss of the inventory of data storage media of the library, in step 533, the inventory is stored in a nonvolatile memory. Specifically, libraries typically keep and maintain the inventory of data storage media, such as cartridges. Each cartridge typically has a label, and each has a logical location. The library is responsible for sending this inventory data any time a host asks for it. Normally, after a power-on or reset, the library conducts an inventory operation to identify the media, since the cartridges could have been manually moved. Large libraries may take a long time to conduct an inventory operation, and the library cannot come ready until it has a valid inventory to report. Hence, in that time, a host might time out, and an inventory operation after a code update would be disruptive.

Hence, step 533 comprises saving the inventory and keeping track of the fact that the reset is caused by a firmware code load operation. The subsequent inventory operation is skipped and provides minimal disruption.

Alternatively, normal operation of the library may maintain the inventory in nonvolatile memory. In this case, step 533 is already accomplished, and only an indicator needs to be used to indicate if a subsequent inventory needs to be performed.

Hence, herein, the terms "stores" or "storing", when employed with an inventory, means either actively storing the inventory, or that the inventory is already stored.

A door monitoring switch could "latch" an indicator if a door was opened, potentially altering the inventory, indicating that the inventory operation should be conducted.

The library is then ready to conduct the switchover to the code update image.

As discussed above, step 530, and optional steps 531 and 533 must be completed before the processor node(s) are reset.

In an embodiment of the present invention, the automated data storage library, via its processor node(s), upon receiving a code update image, determines in step 532 whether multiple processor nodes are to be updated. Step 532 is an optional step, in that separate program code may be employed in libraries having multiple processor nodes to be updated, and in libraries having only a single processor node to be updated. However, step 532 may be useful if only one processor node is to be updated in a library having multiple processor nodes.

In the situation where only one processor node is to be updated, such as illustrated in FIG. 4, the processor node of the library must have completed storage of the code update image to nonvolatile memory prior to step 540, so that the image will not be lost, and then resets the processor 445 in step 540, the processor thereby, in step 543, activating the code update image in nonvolatile memory 446 in place of the current code image, as is known to those of skill in the art. The reset of step 540 may be an electrical reset of processor 445, a software reset of processor 445, or a firmware branch, call, or jump to the new code update image. The processor subsequently comes up from the reset to an operational state, also as is known to those of skill in the art. Next, if the inventory data was saved in step 533, and no door opening was detected, the inventory data is restored from nonvolatile memory in step 545. Subsequently, the processor operates the library, in step 550, to go to an on-line status at the external interface(s). The time required for steps 540–550 is very quick, perhaps less than a second.

Thus, the library provides an update to code of the library processor, while minimizing the time that the library is off-line, rendering the update effectively transparent to the host system(s)

Referring to FIGS. 2, 3 and 5, upon step 532 indicating that multiple processor nodes are to be updated, the associated processor nodes must have completed storage of the code update image to the nonvolatile memories prior to step 560, and then step 560 is conducted by at least one of the processor nodes, resetting the processor 122a, b, c, d of the processor nodes having the stored code update image. The reset may be an electrical reset of processor 122a, b, c, d, a software reset, or a firmware branch, call, or jump to the new code update image 129a, b, c, d. Each of the processors thereby, in step 563, activates the code update image 129a, b, c, d in nonvolatile memory 124a, b, c, d in place of the current code image 128a, b, c, d, as is known to those of skill in the art. The processor 122a, b, c, d subsequently comes up from the reset to an operational state, also as is known to those of skill in the art. Subsequently, the processor operates the library, in step 545, to restore the inventory data, and, in step 550, to go to an on-line status at the external interface (s). The time required for steps 560–564, 545 and 550 is very quick, perhaps less than a second.

Thus, the library provides an update to code of the library processors, while minimizing the time that the library is off-line.

Those of skill in the art understand that code implementations not comprising firmware, but which comprise applications that are so intertwined with the operation of the library, may require updates that would interfere with the operation of the library, and therefore may be updated in accordance with the present invention.

While the preferred embodiments of the present invention have been illustrated in detail, it should be apparent that modifications and adaptations to those embodiments may occur to one skilled in the art without departing from the scope of the present invention as set forth in the following claims.

We claim:

1. An automated data storage library for accessing data storage media in response to commands from at least one external host system, comprising:

a plurality of storage shelves for storing data storage media;

at least one data storage drive for reading and/or writing data with respect to said data storage media;

at least one robot accessor for transporting said data storage media between said plurality of storage shelves and said at least one data storage drive;

at least one external interface for communicating with said at least one external host system;

at least one processor node, each of said processor nodes having at least a processor, said processor operating from a current code image; and at least one memory;
said automated data storage library:
receives a code update image;
during and subsequent to receiving said code update image, continues to operate said automated data storage library;
stores said code update image in said at least one memory;
determines within a predetermined timeout period, whether said code update image has been stored in said at least one memory, and, if so, subsequently, operates said automated data storage library to an off-line status at said at least one external interface;
resets said processor of said at least one processor node, thereby activating said code update image in place of said current code image, said processor subsequently coming up from said reset to an operational state; and
subsequently, goes to an on-line status at said at least one external interface.

2. The automated data storage library of claim 1, additionally comprising a work queue for jobs received from said at least one host system, and said automated data storage library, in operating said automated data storage library to said off-line status, additionally comprises completing said jobs in said work queue.

3. The automated data storage library of claim 1, wherein said automated data storage library, in operating said automated data storage library to said off-line status, additionally comprises reporting at said at least one external interface that said automated data storage library is currently not ready and will become ready.

4. An automated data storage library for accessing data storage media in response to commands from at least one external host system, comprising:

a plurality of storage shelves for storing data storage media;

at least one data storage drive for reading and/or writing data with respect to said data storage media;

at least one robot accessor for transporting said data storage media between said plurality of storage shelves and said at least one data storage drive;

at least one external interface for communicating with said at least one external host system;

at least one processor node, each of said processor nodes having at least a processor, said processor operating from a current code image; and at least one memory;
said automated data storage library:
receives a code update image;
during and subsequent to receiving said code update image, continues to operate said automated data storage library;
stores said code update image in said at least one memory;
determines within a predetermined timeout period, whether said code update image has been stored in said at least one memory; and
if so, subsequently, operates said automated data storage library to an off-line status at said at least one external interface; moves said at least one robot accessor to "home" position; and resets said processor of said at least one processor node, thereby activating said code update image in place of said current code image, said processor subsequently coming up from said reset to an operational state; and, subsequently, goes to an on-line status at said at least one external interface.

5. An automated data storage library for accessing data storage media in response to commands from at least one external host system, comprising:

a plurality of storage shelves for storing data storage media;

at least one data storage drive for reading and/or writing data with respect to said data storage media;

at least one robot accessor for transporting said data storage media between said plurality of storage shelves and said at least one data storage drive;

at least one external interface for communicating with said at least one external host system; and at least one processor node for communicating with said at least one external interface, said at least one processor node having at least a processor, said processor operating from a current code image, said at least one processor node additionally associated with a nonvolatile memory, and said at least one processor node operating said automated data storage library, said at least one processor node:

receives a code update image, while continuing to operate said automated data storage library;

stores said code update image in said nonvolatile memory;

operates said automated data storage library to an off-line status at said at least one external interface;

resets said processor, activates said code update image of said nonvolatile memory in place of said current code image, and comes up from said reset to an operational state; and subsequent to said processor coming to said operational state, operates said automated data storage library to go to an on-line status at said at least one external interface.

6. The automated data storage library of claim 5, wherein said at least one processor node comprises a work queue for jobs received from said at least one host system, and said at least one processor node, in operating said automated data storage library to said off-line status, additionally comprises completing said jobs in said work queue.

7. The automated data storage library of claim 5, wherein said at least one processor node, in operating said automated data storage library to said off-line status, additionally comprises reporting at said at least one external interface that said automated data storage library is currently not ready and will become ready.

8. The automated data storage library of claim 5, wherein said at least one processor node, upon receiving a partial said code update image while operating said automated data storage library, stores said partial code update image in said nonvolatile memory, continues operating said automated data storage library, and waits for the remainder of said code update image.

9. The automated data storage library of claim 5, wherein said at least one processor node, in operating said automated data storage library to said off-line status, additionally comprises moving said robot accessor to a "home" position.

10. An automated data storage library for accessing data storage media in response to commands from at least one external host system, comprising:

a plurality of storage shelves for storing data storage media;

at least one data storage drive for reading and/or writing data with respect to said data storage media;

at least one robot accessor for transporting said data storage media between said plurality of storage shelves and said at least one data storage drive;

at least one external interface for communicating with said at least one external host system;

a common bus; and a plurality of processor nodes communicating over said common bus, each of said processor nodes having at least a processor and associated with a nonvolatile memory, said processor operating from a current code image, at least one of said processor nodes for communicating with said at least one external host at said external interface, and at least one said processor node for operating said robot accessor, and said plurality of processor nodes operating said automated data storage library, said plurality of processor nodes:

at least one said processor node receives a code update image while said plurality of processor nodes continue to operate said automated data storage library;

at least one said processor node stores said code update image in said associated nonvolatile memory;

subsequent to said at least one processor node receiving said code update image, said plurality of processor nodes operate said automated data storage library to an off-line status at said at least one external interface;

said at least one processor node resets said processor, activates said code update image of said associated nonvolatile memory in place of said current code image, comes up from said reset to an operational state; and subsequently, said plurality of processor nodes go to an on-line status at said at least one external interface.

11. The automated data storage library of claim 10, wherein said plurality of processor nodes, operate said automated data storage library to said off-line status at said at least one external interface upon all of said plurality of processor nodes completing said storage of said code update image within a predetermined timeout period.

12. The automated data storage library of claim 10, wherein at least one of said plurality of processor nodes, upon receiving a partial said code update image while operating said automated data storage library, stores said partial code update image in said associated nonvolatile memory, and waits for the remainder of said code update image, such that said plurality of processor nodes continue operating said automated data storage library.

13. The automated data storage library of claim 12, wherein said at least one processor node, upon storing a complete said code update image, communicates said storage on said common bus.

14. The automated data storage library of claim 10, wherein said plurality of processor nodes, additionally, upon operating said automated data storage library to said off-line status at said at least one external interface, reset said automated data storage library, thereby resetting said at least one processor node to reset said processor, and activate said code update image of said associated nonvolatile memory in place of said current code image.

15. The automated data storage library of claim 10, wherein said plurality of processor nodes, in operating said automated data storage library to said off-line status, additionally comprises moving said robot accessor to a "home" position.

16. The automated data storage library of claim 10, wherein said plurality of processor nodes comprise a work queue for jobs received from said at least one host system, and said plurality of processor nodes, in operating said automated data storage library to said off-line status, additionally comprises completing said jobs in said work queue.

17. The automated data storage library of claim 10, wherein said plurality of processor nodes, in operating said automated data storage library to said off-line status, additionally comprises reporting at said at least one external interface that said automated data storage library is currently not ready and will become ready.

18. A processor node of an automated data storage library, at least said processor node for operating said automated data storage library; said automated data storage library having a plurality of storage shelves for storing data storage media, at least one data storage drive for reading and/or writing data with respect to said data storage media, at least one robot accessor for transporting said data storage media between said plurality of storage shelves and said at least one data storage drive, and at least one external interface for communicating with said at least one external host system; said processor node comprising:

at least a processor; and a nonvolatile memory;

said processor node:

upon receiving a code update image while operating said automated data storage library in accordance with a current code image, stores said code update image in said nonvolatile memory, while continuing to operate said automated data storage library; and subsequent to completing said storage of said code update image by said processor node, at least said processor node operates said automated data storage library to an off-line status at said at least one external interface;

resets said processor of said processor node, activates said code update image in place of said current code image, and comes up to an operational state; and at least said processor node subsequently operates said automated data storage library to go to an on-line status at said at least one external interface.

19. The processor node of claim 18, upon receiving a partial said code update image while operating said automated data storage library, stores said partial code update image in said nonvolatile memory, continues operating said automated data storage library, and waits for the remainder of said code update image.

20. The processor node of claim 18, in operating said automated data storage library to said off-line status, additionally comprises moving said robot accessor to a "home" position.

21. A method for performing a transparent update of code in an automated data storage library running a current version of said code, said automated data storage library for accessing data storage media in response to commands from at least one external host system, said automated data storage library comprising a plurality of storage shelves for storing data storage media; at least one data storage drive for reading and/or writing data with respect to said data storage media; at least one robot accessor for transporting said data storage media between said plurality of storage shelves and said at least one data storage drive; at least one external interface for communicating with said at least one external host system; at least one processor node, each of said processor nodes having at least a processor, said processor operating from a current code image; and at least one nonvolatile memory, each said nonvolatile memory associated with at least one of said processor nodes; said method comprising the steps of:

receiving a code update image;

during and subsequent to receiving said code update image, continuing to operate said automated data storage library;

storing said code update image in said at least one nonvolatile memory;

operating said automated data storage library to an off-line status at said at least one external interface;

resetting said processor of said at least one processor node associated with said at least one nonvolatile memory having said stored code update image, thereby activating said code update image in place of said current code image, said processor subsequently coming up from said reset to an operational state; and subsequent to said at least one processor node coming up from said reset to said operational state, going to an on-line status at said at least one external interface.

22. The method of claim 21, wherein said automated data storage library additionally comprises a work queue for jobs received from said at least one host system; and wherein said method, in operating said automated data storage library to said off-line status, additionally comprises completing said jobs in said work queue.

23. The method of claim 21, in operating said automated data storage library to said off-line status, additionally comprises reporting at said at least one external interface that said automated data storage library is currently not ready and will become ready.

24. The method of claim 21, in operating said automated data storage library to said off-line status, additionally comprises moving said robot accessor to a "home" position.

25. A computer program product of a computer readable medium usable with a programmable computer, said computer program product having computer readable program code embodied therein for performing a transparent update of operational code in an automated data storage library running a current version of said operational code, said automated data storage library for accessing data storage media in response to commands from at least one external host system, said automated data storage library comprising a plurality of storage shelves for storing data storage media; at least one data storage drive for reading and/or writing data with respect to said data storage media; at least one robot accessor for transporting said data storage media between said plurality of storage shelves and said at least one data storage drive; at least one external interface for communicating with said at least one external host system; at least one processor node, each of said processor nodes having at least a processor, said processor operating from a current operational code image; and at least one memory, each said memory associated with at least one of said processor nodes; said computer program product comprising:

computer readable program code which causes said processor of said at least one processor node to receive an operational code update image;

computer readable program code which causes said processor of said at least one processor node, to continue to operate said automated data storage library during and subsequent to receiving said operational code update image, computer readable program code which causes said processor of said at least one processor node, to store said operational code update image in said at least one memory;

computer readable program code which causes said processor of said at least one processor node, to determine within a predetermined timeout period, whether said operational code update image has been stored in said at least one memory, and, if so, subsequently to operate said automated data storage library to an off-line status at said at least one external interface;

computer readable program code which causes said processor of said at least one processor node, to reset said processor of said at least one processor node, thereby activating said operational code update image in place of said current operational code image, said processor subsequently coming up from said reset to an operational state; and computer readable program code which causes said processor of said at least one processor node, subsequent to said at least one processor node coming up from said reset to said operational state, to go to an on-line status at said at least one external interface.

26. The computer program product of claim 25, wherein said automated data storage library additionally comprises a work queue for jobs received from said at least one host system; and wherein said computer readable program code which causes said processor of said at least one processor node to operate said automated data storage library to said off-line status, additionally comprises completing said jobs in said work queue.

27. The computer program product of claim 25, wherein said computer readable program code which causes said processor of said at least one processor node to operate said automated data storage library to said off-line status, additionally comprises reporting at said at least one external interface that said automated data storage library is currently not ready and will become ready.

28. The computer program product of claim 25, wherein said computer readable program code which causes said processor of said at least one processor node to operate said automated data storage library to said off-line status, additionally comprises moving said robot accessor to a "home" position.

29. A computer program product of a computer readable medium usable with a programmable computer, said computer program product having computer readable program code embodied therein for performing a transparent update of operational code in a processor node of an automated data storage library, at least said processor node for operating said automated data storage library; said automated data storage library having a plurality of storage shelves for storing data storage media, at least one data storage drive for reading and/or writing data with respect to said data storage media, at least one robot accessor for transporting said data storage media between said plurality of storage shelves and said at least one data storage drive, and at least one external interface for communicating with at least one external host system; said processor node comprising at least a processor, said processor node associated with a nonvolatile memory; said computer program product comprising:

computer readable program code which causes said processor of said processor node to receive an operational code update image, while operating said automated data storage library in accordance with a current operational code image;

computer readable program code which causes said processor of said processor node, to store said operational code update image in said nonvolatile memory;

computer readable program code which causes said processor of said processor node, to operate said automated data storage library to an off-line status at said at least one external interface; and computer readable program code which causes said processor of said processor node to reset said processor of said processor node, to activate said operational code update image of said nonvolatile memory in place of said current operational code image, and to come up to an operational state; and to subsequently operate said automated data storage library to go to an on-line status at said at least one external interface.

30. The computer program product of claim 29, additionally comprising computer readable program code which causes said processor of said processor node, upon receiving a partial said operational code update image while operating said automated data storage library, to store said partial operational code update image in said nonvolatile memory, to continue operating said automated data storage library, and to wait for the remainder of said operational code update image.

31. The computer program product of claim 29, wherein said automated data storage library additionally comprises a work queue for jobs received from said at least one host system; and wherein said computer readable program code which causes said processor of said processor node to operate said automated data storage library to said off-line status, additionally comprises completing said jobs in said work queue.

32. The computer program product of claim 29, wherein said computer readable program code which causes said processor of said processor node to operate said automated data storage library to said off-line status, additionally comprises reporting at said at least one external interface that said automated data storage library is currently not ready and will become ready.

33. The computer program product of claim 29, wherein said computer readable program code which causes said processor of said processor node operating said automated data storage library to said off-line status, additionally comprises moving said robot accessor to a "home" position.

34. An automated data storage library for accessing data storage media in response to commands from at least one external host system, comprising:

a plurality of storage shelves for storing data storage media;

at least one data storage drive for reading and/or writing data with respect to said data storage media;

at least one robot accessor for transporting said data storage media between said plurality of storage shelves and said at least one data storage drive;

at least one external interface for communicating with said at least one external host system;

at least one processor node, each of said processor nodes having at least a processor, said processor operating from a current code image, at least one said processor node having inventory data relating to said data storage media that are in said automated data storage library; and at least one nonvolatile memory;

said automated data storage library:

receives a code update image while operating said automated data storage library;

during and subsequent to receiving said code update image, continues to operate said automated data storage library;

stores said code update image in a said nonvolatile memory;

operates said automated data storage library to an off-line status at said at least one external interface;

stores said inventory data in a said nonvolatile memory;

resets said processor of said at least one processor node having said stored code update image, thereby activating said code update image of said nonvolatile memory in place of said current code image, said processor subsequently coming up from said reset to an operational state; and subsequently, restores said inventory data to said processor node, and goes to an on-line status at said at least one external interface.

35. A method for performing a transparent update of code in an automated data storage library running a current version of said code, said automated data storage library for accessing data storage media in response to commands from at least one external host system, said automated data storage library comprising a plurality of storage shelves for storing data storage media; at least one data storage drive for reading and/or writing data with respect to said data storage media; at least one robot accessor for transporting said data storage media between said plurality of storage shelves and said at least one data storage drive; at least one external interface for communicating with said at least one external host system; at least one processor node, each of said processor nodes having at least a processor, said processor operating from a current code image, at least one said processor node having inventory data relating to said data storage media that are in said automated data storage library; and at least one nonvolatile memory; said method comprising the steps of:

receiving a code update image;

during and subsequent to receiving said code update image, continuing to operate said automated data storage library;

storing said code update image in a said nonvolatile memory; operating said automated data storage library to an off-line status at said at least one external interface;

storing said inventory data in a said nonvolatile memory;

resetting said processor of a said at least one processor node having said stored code update image, thereby activating said code update image of said nonvolatile memory in place of said current code image, said processor subsequently coming up from said reset to an operational state; and subsequent to said at least one processor node coming up from said reset to said operational state, restoring said inventory data to said processor node, and going to an on-line status at said at least one external interface.

36. A computer program product of a computer readable medium usable with a programmable computer, said computer program product having computer readable program code embodied therein for performing a transparent update of operational code in an automated data storage library running a current version of said operational code, said automated data storage library for accessing data storage media in response to commands from at least one external host system, said automated data storage library comprising a plurality of storage shelves for storing data storage media; at least one data storage drive for reading and/or writing data with respect to said data storage media; at least one robot accessor for transporting said data storage media between said plurality of storage shelves and said at least one data storage drive; at least one external interface for communicating with said at least one external host system; at least one processor node, each of said processor nodes having at least a processor, said processor operating from a current operational code image, at least one said processor node having inventory data relating to said data storage media that are in said automated data storage library; and at least one nonvolatile memory; said computer program product comprising:

computer readable program code which causes said processor of said at least one processor node, to receive an operational code update image while continuing to operate said automated data storage library;

computer readable program code which causes said processor of said at least one processor node, to store said operational code update image in a said nonvolatile memory;

computer readable program code which causes said processor of said at least one processor node, to operate said automated data storage library to an off-line status at said at least one external interface;

computer readable program code which causes said processor of said at least one processor node, to store said inventory data in a said nonvolatile memory;

computer readable program code which causes said processor of said at least one processor node, to reset said processor of said at least one processor node having said stored operational code update image, thereby activating said operational code update image in place of said current operational code image, said processor subsequently coming up from said reset to an operational state; and computer readable program code which causes said processor of said at least one processor node, subsequent to said at least one processor node coming up from said reset to said operational state, to restore said inventory data to said processor node, and to go to an on-line status at said at least one external interface.

* * * * *